United States Patent [19]

Hardy

[11] 4,303,289

[45] Dec. 1, 1981

[54] STRUCTURAL COMPONENTS

[75] Inventor: Terence Hardy, Belper, England

[73] Assignee: L.B. (Plastics) Limited, Belper, England

[21] Appl. No.: 37,914

[22] Filed: May 9, 1979

[30] Foreign Application Priority Data

May 13, 1978 [GB] United Kingdom ............... 19450/78

[51] Int. Cl.³ ...................... A47B 47/00; A47B 88/00
[52] U.S. Cl. ............................... 312/330 R; 312/140;
403/205; 403/295; 403/231
[58] Field of Search ................... 313/330 R, 140, 111;
108/56.1; 52/656; 403/295, 231, 205, 403

[56] References Cited

U.S. PATENT DOCUMENTS

| 215,298 | 5/1879 | Rix | 403/295 |
|---|---|---|---|
| 1,552,635 | 9/1925 | Milligan | 312/140 |
| 3,085,841 | 4/1963 | Snyder | 312/140 |
| 3,901,572 | 8/1975 | Litchfield | 312/330 R |
| 4,042,288 | 8/1977 | Litchfield | 312/330 R |
| 4,099,815 | 7/1978 | Cox et al. | 312/330 R |
| 4,108,520 | 8/1978 | Litchfield | 312/330 R |
| 4,162,114 | 7/1979 | Litchfield et al. | 312/330 R |

FOREIGN PATENT DOCUMENTS

| 1263234 | 12/1958 | France | 312/140 |
|---|---|---|---|
| 4146 | of 1910 | United Kingdom | 403/205 |
| 1358047 | 6/1974 | United Kingdom | 312/330 R |
| 1478845 | 7/1977 | United Kingdom | 312/140 |

Primary Examiner—Victor N. Sakran
Attorney, Agent, or Firm—C. O. Marshall, Jr.

[57] ABSTRACT

A connecting member for use in interconnecting elongated structural components having openings in their ends, the connecting member including projecting spigot members for engagement in the openings and a cover portion adapted to extend over portions of the outer surfaces of the interconnected components to conceal the joint between them. In one particular arrangement the connecting member comprises a corner piece for interconnecting hollow extruded plastics components to form a tray construction.

7 Claims, 4 Drawing Figures

STRUCTURAL COMPONENTS

The invention relates to structural components and is especially concerned with the interconnection of structural components to form frames and like structures.

It is an object of the present invention to provide a means for interconnecting structural components which provides a secure means of connection while enabling the components to be readily dismantled and at the same time concealing the joint between the components and presenting a neat outward appearance.

The invention provides a connecting member for use in interconnecting elongated structural components having openings in their ends, the connecting member including projecting spigot members adapted for engagement in said openings, and a cover portion adapted to extend over portions of the outer surfaces of the interconnected components to conceal the joint between them.

Preferably the connecting member also includes retaining means for retaining the connecting member in engagement with the components. The retaining means may comprise projections on the inner surface of said cover portions engageable in apertures formed in the outer surfaces of the components, the cover portion and/or said portions of the surfaces of said components being flexible to enable engagement of the projections in the associated apertures.

In a preferred arrangement applied to the construction of a tray, the structural components comprise side members for the tray and are of hollow extruded construction provided with longitudinally extending slots in the surfaces thereof which are innermost in use to receive a tray bottom, the spigot members of each of said connecting members extending in two directions at right angles to one another and the associated portion extending over the end regions of the adjacent side members to conceal the joint between the side members and provides a decorative finish at the corners of the assembled tray.

An embodiment of the invention will be now described, by way of example only, with reference to the accompanying drawings in which.

Figure 1:
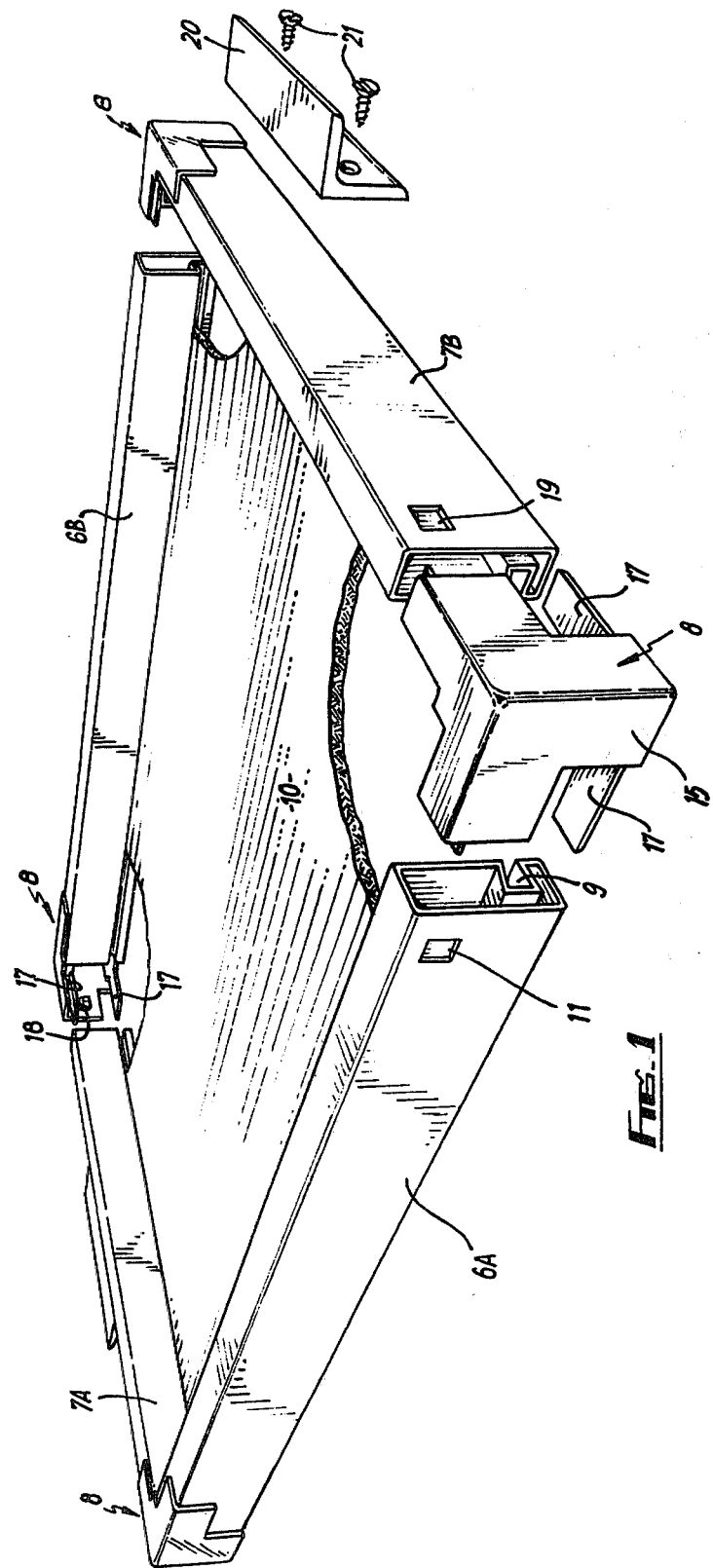
FIG. 1 is an exploded perspective view of a tray constructed using structural components and connecting members according to the invention.
Figure 2:
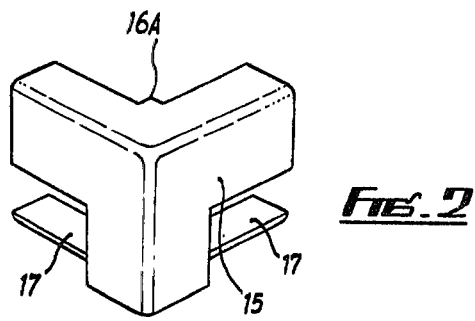
FIG. 2 is an outside perspective view of a corner connector.
Figure 3:
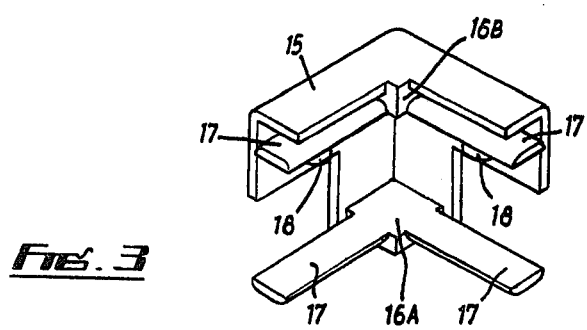
FIG. 3 is an inside perspective view of a corner connector.
Figure 4:
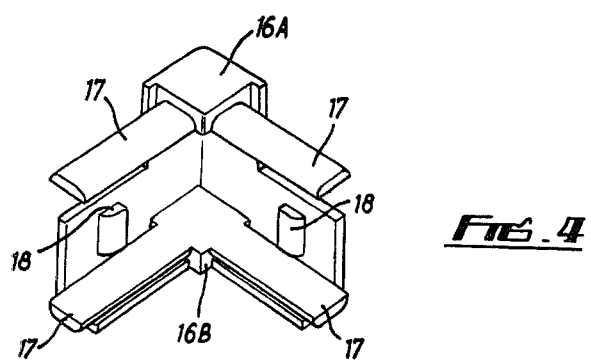
FIG. 4 is a view similar to FIG. 3 showing the connector in an inverted position to more clearly illustrate certain details.

Referring to the drawing, the tray is constructed from side and end walls members 6A, 6B and 7A, 7B interconnected at right angles to one another by corner connectors 8. The side and end wall members are of hollow extruded plastics construction and are provided with longitudinally extending slots 9 in their inner surfaces which are adapted to receive and locate the edges of a tray base 10. Each of the wall members 6A, 6B and 7A, 7B is provided with an aperture 11 adjacent each end of its outer surface for engagement with the corner connectors 8 as will be described hereafter.

The corner connectors each comprise a cover portion 15 incorporating upper and lower corner blocks 16A, 16B each of which carries projecting spigot members 17 extending at right angles to one another and adapted for engagement in the open ends of the wall members in abutting contact with the upper and lower ends of the cavities in the wall members. The cover portion 15 extends over the outer surfaces of the adjacent ends of the wall members and conceals the joint between them.

In order to retain the corner connections in position, projecting detents 18 are provided on the inner faces of those portions of the cover portions which overlie the outer surfaces of the wall members, for engagement in the apertures 11. The corner connectors and the wall members are formed from synthetic plastics material and their construction is such that when the corner connectors are engaged in the ends of the wall members, sufficient flexing of one or both components takes place to enable the detents to slide over the outer surfaces of the wall members until they spring into locking engagement with the apertures 11. The corner connectors are thus positively locked in engagement with the wall members but may be released by inserting a screwdriver or similar implement between the cover portion and the outer surface of the wall element and flexing the cover portion outwardly to withdraw the detent 18 from the associated aperture 11, thereby enabling the components to be separated.

It will be appreciated that since the detents are mounted on the inner surfaces of the cover portions of the corner connectors and the apertures 11, in the wall elements are engaged by the detents when the components are assembled, the detents and holes are concealed from view by the cover portions which thus present a neat and attractive appearance to the corner regions of the tray as can be seen in FIG. 1.

Thus in assembling the tray, three of the wall members are interconnected at right angles to one another by means of two corner connectors which are pushed home until the associated detents are engaged with the holes in the wall members. The base 10 of the tray is then slid into engagement with the grooves 9 in the assembled wall members and the remaining two corners connectors are engaged in the opposite ends of the fourth wall member which is then connected to the other wall members and the base to complete the assembly. Handles 20 may be attached to the end wall members of the tray either before or after assembly by screws 21 or other suitable means.

Thus there is provided a means of contrcting a tray from separate components which may be quickly and easily assembled but retains the facility for disassembly subsequently if required and also presents a neat and attractive appearance when assembled. The components may also be simply and cheaply manufactured since the wall members may all be formed from a single extrusion cut to suitable lengths and provided with punched holes adjacent their ends. The corner pieces are also all of identical construction thereby simplifying manufacture and assembly. Moreover assembly does not require the use of adhesives, rivets or other separate components which may be readily mislaid.

Various modifications may be made without departing from the invention. For example, the construction of the spigot members may be altered substantially and the positions of the projecting detents may be altered or they may be replaced by other forms of retaining means. Adhesive could be used in some cases if desired. It should also be appreciated that the invention may be applied to the interconnection of a wide variety of components to produce articles other than trays.

I claim:

1. A connecting member for use in interconnecting elongated structural components having openings in their ends, the connecting member including projecting spigot members adapted for engagement in said openings, retaining means for retaining the connecting member in engagement with the components, and a cover portion adapted to extend over portions of the outer surfaces of the interconnected components to conceal the joint between them, said retaining means comprising projecting detents provided on the inner surface of said cover portion and engageable in complementary apertures in the structural components, the cover portion and/or the outer surfaces of the components being flexible to enable engagement of the detents in the associated apertures.

2. A connecting member according to claim 1 wherein said spigot members comprise pairs of upper and lower projections spaced apart by a distance such that the spigot members abut the inner surfaces of the upper and lower edges of the structural components when the components and connecting members are assembled.

3. A connecting member according to claim 1 or 2 comprising a unitary moulding from synthetic plastics material.

4. A structural assembly comprising four connecting members according to claim 1 and four elongated structural components having openings in their ends and interconnected by said connecting members.

5. A structural assembly according to claim 4 wherein said structural components are of hollow extruded plastics construction.

6. A structural assembly according to claim 5 wherein said structural components incorporate inwardly-directed longitudinal slots adapted to receive the edges of a base member.

7. A structural assembly according to claim 6 in the form of a tray, said structural components comprising side and end walls of the tray and said base member comprising the main surface of the tray.

* * * * *